Feb. 24, 1942. M. L. MUELLER 2,274,341
HEATING APPARATUS
Filed June 26, 1941 4 Sheets-Sheet 1
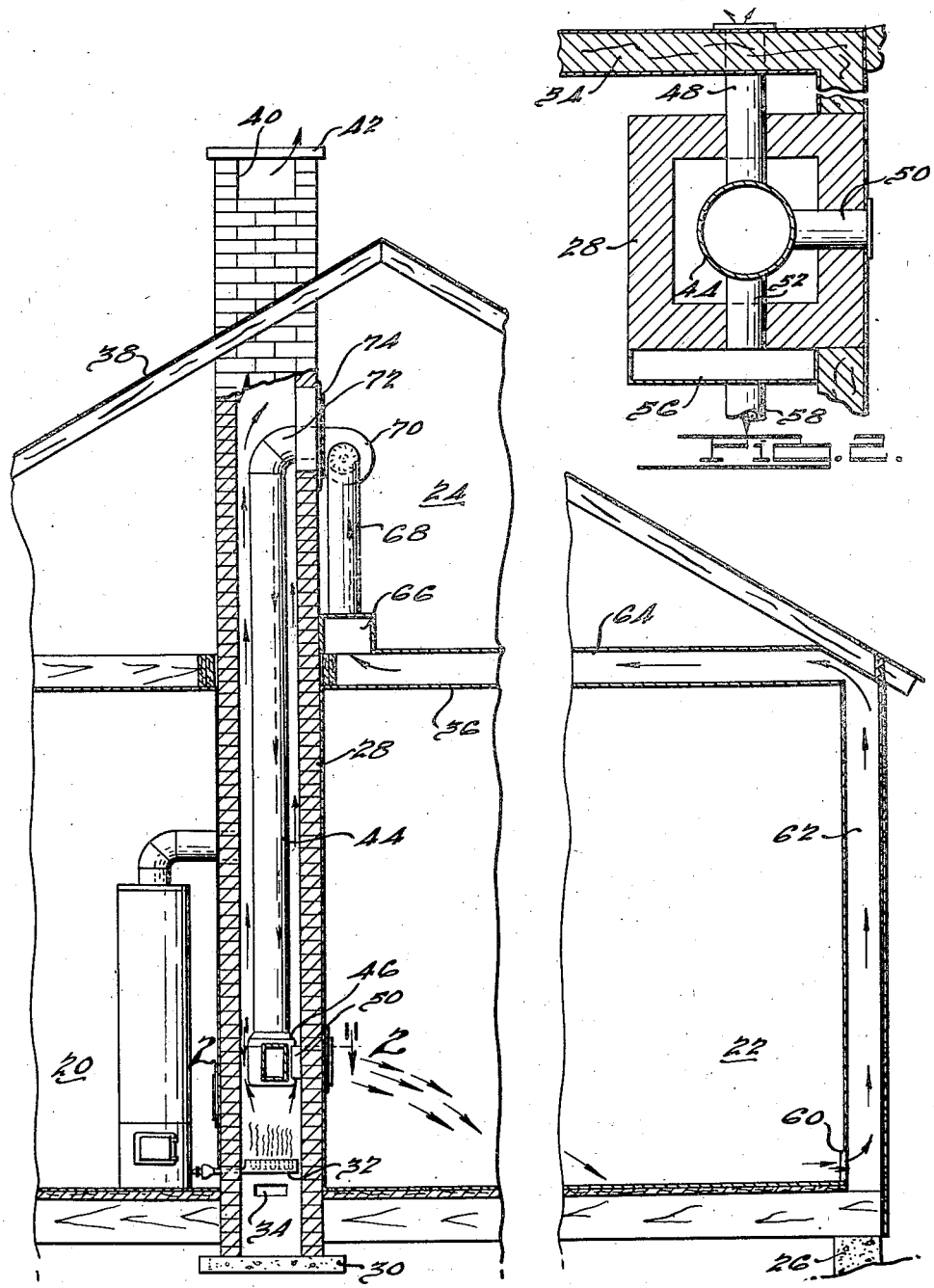
INVENTOR
Moritz L. Mueller.
BY Edwin J. Balluff
ATTORNEY Feb. 24, 1942.  M. L. MUELLER  2,274,341
HEATING APPARATUS
Filed June 26, 1941  4 Sheets-Sheet 2
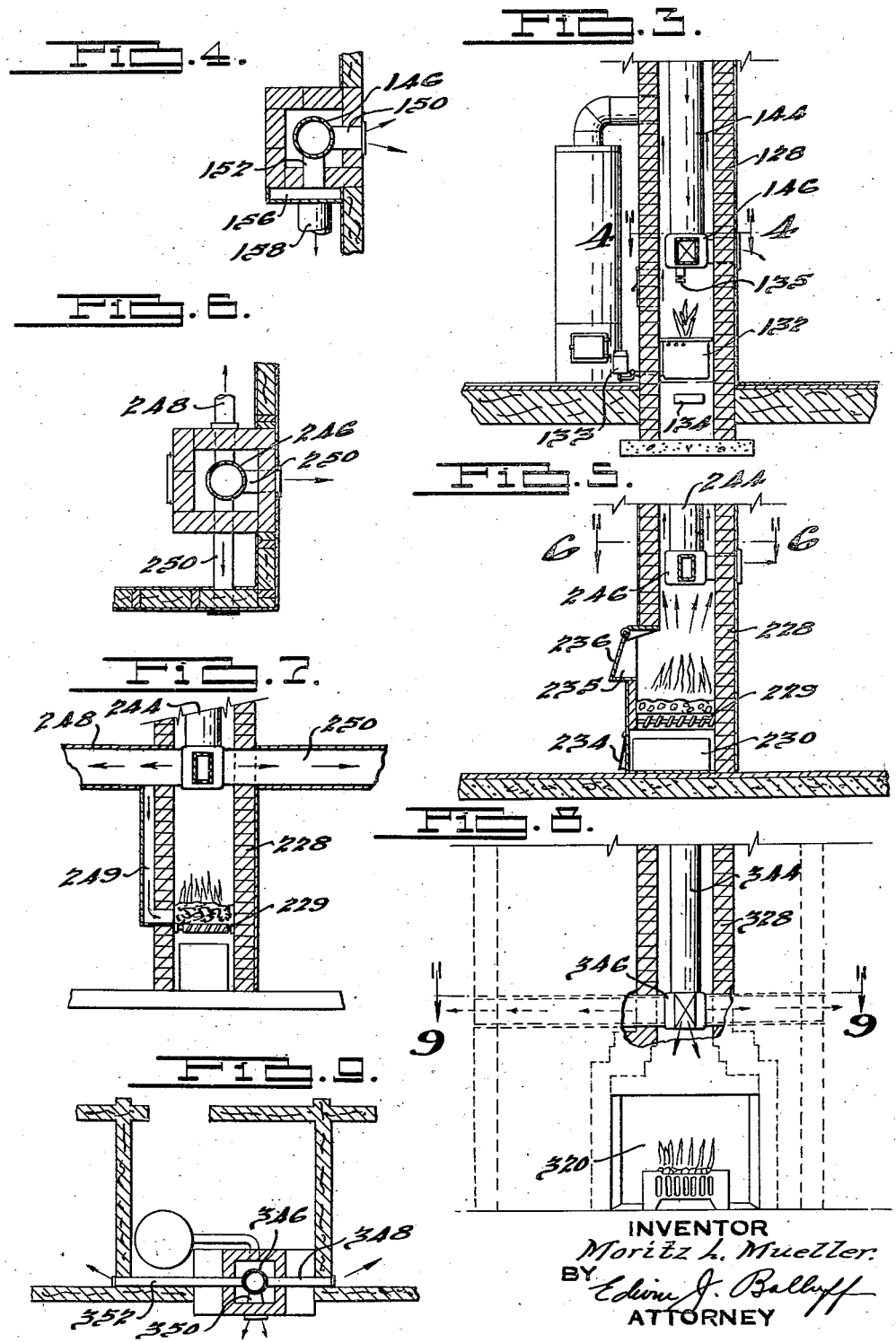
INVENTOR
Moritz L. Mueller
BY Edwin J. Balluff
ATTORNEY Feb. 24, 1942. M. L. MUELLER 2,274,341
HEATING APPARATUS
Filed June 26, 1941 4 Sheets-Sheet 3
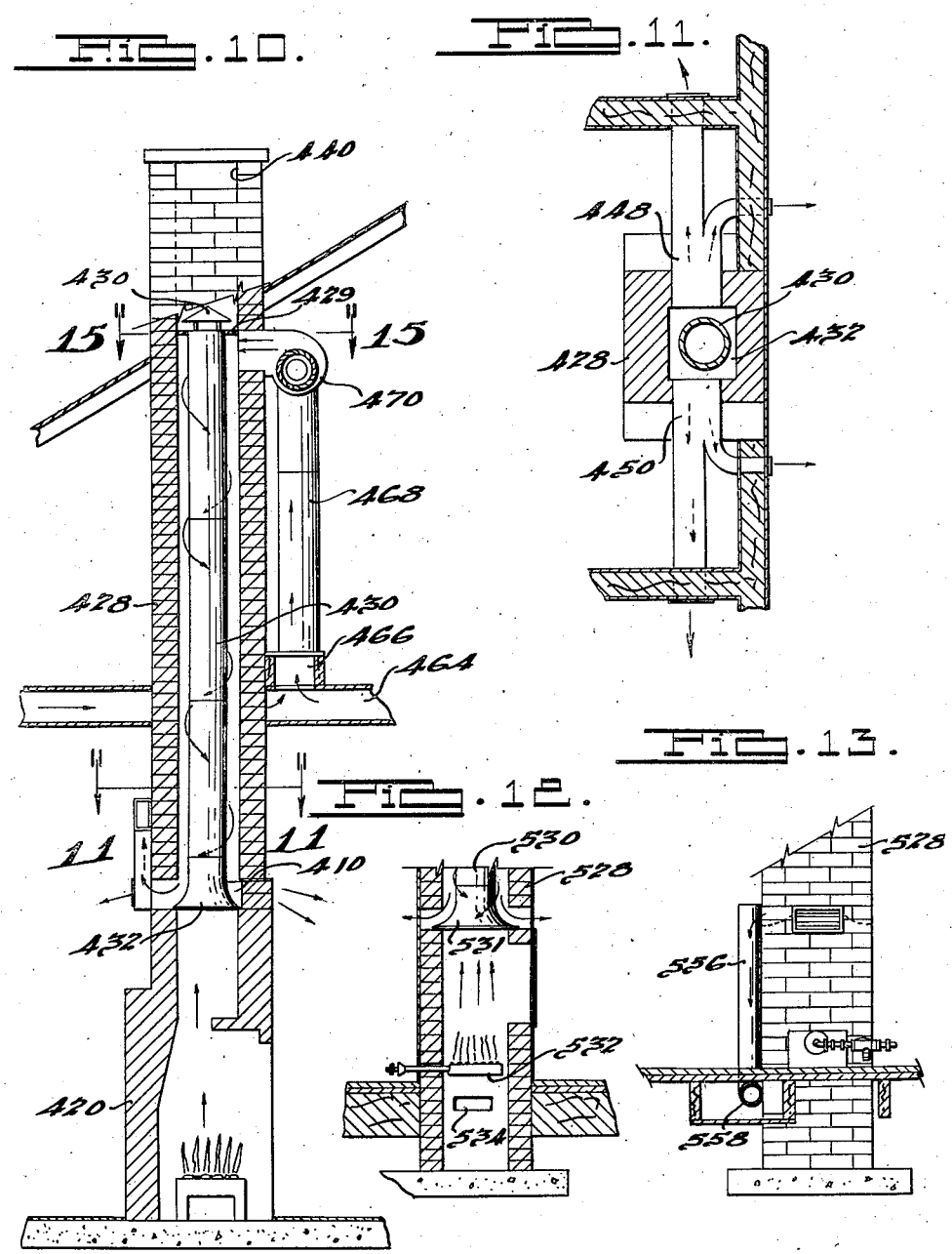
INVENTOR
Moritz L. Mueller,
BY Edwin J. Balluff
ATTORNEY Feb. 24, 1942.  M. L. MUELLER  2,274,341
HEATING APPARATUS
Filed June 26, 1941  4 Sheets-Sheet 4

INVENTOR
Moritz L. Mueller
BY Edwin J. Balluff
ATTORNEY

Patented Feb. 24, 1942

2,274,341

UNITED STATES PATENT OFFICE 2,274,341

HEATING APPARATUS

Moritz L. Mueller, Grosse Pointe, Mich., assignor, by mesne assignments, to said Moritz L. Mueller and John H. Mueller, Detroit, Mich., as joint tenants Application June 26, 1941, Serial No. 399,780

25 Claims. (Cl. 237—55)

This invention relates to furnaces.

A principal object of the invention is to provide a novel and improved type or form of furnace which is efficient in operation and inexpensive in construction.

Another object of the invention is to provide a simplified and inexpensive type of furnace construction which is particularly adapted, although not limited, for use in low cost homes and buildings.

Another object of the invention is to provide a new type of furnace utilizing a chimney as an integral part of the furnace for housing the combustion burner and the heat exchange parts of the furnace.

Other objects and advantages of the invention will be apparent from a consideration of the following specification taken in conjunction with the accompanying drawings, of which there are four sheets and wherein:

Fig. 1 is a vertical cross-section through a part of a house illustrating one form of furnace embodying the invention and the method of circulating the air to be heated through the furnace and through the house;

Fig. 2 is a horizontal sectional view taken in a plane along the line 2—2 of Fig. 1, looking in the direction of the arrows;

Fig. 3 is a fragmentary view illustrating a modification of Fig. 1 and using a pot type of burner as the source of heat for the furnace;

Fig. 4 is a horizontal section taken in a plane along the line 4—4 of Fig. 3, looking in the direction of the arrows;

Fig. 5 is a fragmentary view illustrating a modification of Fig. 1 and utilizing a conventional hand fired coal or wood burning combustion burner as the source of heat for the furnace;

Fig. 6 is a horizontal section taken in a plane along the line 6—6 of Fig. 5, looking in the direction of the arrows;

Fig. 7 is a modification of Fig. 6 illustrating a forced draft for the fuel burner;

Fig. 8 is a fragmentary view illustrating a further modification of Fig. 1 and utilizing an open fireplace as the burner or source of heat for the furnace;

Fig. 9 is a horizontal section taken in a plane along the line 9—9 of Fig. 8;

Fig. 10 is a modification of Figs. 1 and 8 utilizing an open fireplace as the source of heat;

Fig. 11 is a horizontal section taken in a plane along the line 11—11 of Fig. 10;

Fig. 12 is a modification of Figs. 1 and 10 in which a gas burner is utilized as a source of heat;

Fig. 13 is a side elevational view of the structure shown in Fig. 12;

Figure 14:
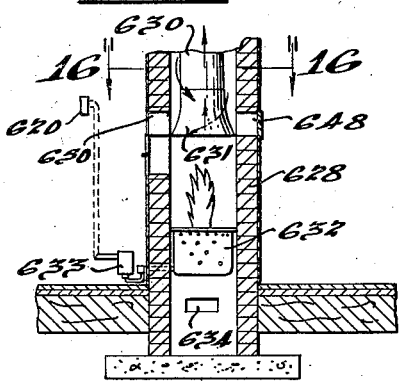
Fig. 14 is a further modification of Figs. 1 and 10 and utilizing a pot burner as the source of heat.
Figure 15:
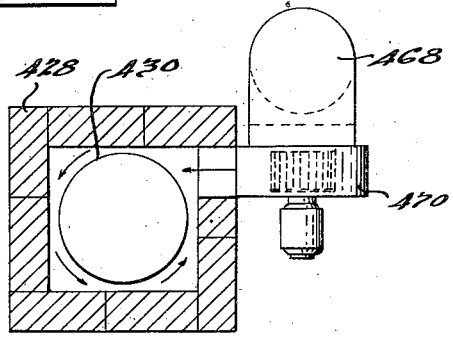
Fig. 15 is a section taken in a plane along the line 15—15 of Fig. 10 and illustrating the blower assembly in its relationship to the chimney.

Referring now to Figs. 1 and 2, there is illustrated a house having rooms 20, 22, and 24. The house may be of conventional construction and rest upon a concrete slab or footings 26. A chimney 28, built of brick or other suitable material, extends up through the house and is supported by a footing 30. As illustrated in Fig. 1, a gas burner 32 of usual cast iron construction is located in the base of the chimney 28 a short distance above the level of the floor of the house, and a damper controlled air inlet opening 34 is provided in a wall of the chimney below the burner 32. The chimney extends upwardly through the house, through the ceiling 36 above the rooms 20 and 22, and through the roof 38 in a conventional manner. The upper end of the chimney is open at the side as at 40 so as to permit the escape of flue gases. A removable cover 42 may be provided to overlie the top opening of the chimney. The space within the chimney is utilized as a heat exchanger and to this end a metal pipe 44 is arranged within the chimney in spaced relationship to the side walls thereof thereby providing a path of travel for the flue gases from the burner 32 between the outside of the pipe 44 and the inside of the chimney 28.

The pipe 44 terminates at its lower end in a heavy cast iron foot or header 46 to which ducts 48, 50 and 52 are connected. The ducts 48, 50, and 52 extend laterally through suitable openings in the wall of the chimney 28 and are provided for conducting heated air to various parts of the house. For example, the duct 50 may open into the room 22 for supplying heated air thereto, the duct 48 may extend through an opening in a wall 54 for supplying heat to the room of which the wall 54 forms a part, and the duct 52 may empty into a vertical duct 56 extending downwardly along an outside face of the chimney 28 and from the lower end of which duct 56 a lateral duct 58 may run to supply heated air to a distant part of the house.

Baseboard openings such as that indicated at 60 and located along the outside wall of the rooms, allow cooled air from the rooms to be drawn upwardly through ducts 62, formed between the studding in the walls, and thence through the duct 64 formed between covered attic floor joists, thence into header 66 and conduit 68 which communicates with the intake side of the blower 70. The header 66 may communicate with several ducts 64. The blower 70 is connected to the upper end of the pipe 44 by an elbow 72 which extends through an opening in the side wall of the chimney closed by plate 74.

The flue gases resulting from operation of the burner 32 pass upwardly around the header 46 and around the pipe 44 and eventually escape through the opening 40 in the upper end of the chimney due to natural draft circulation of the flue gases.

The air from the rooms to be heated is returned to the blower through the ducts 62, 64, 66, and 68 and is forced by the blower downwardly through the pipe 44 and thence through the ducts 48, 50, and 52 in the manner previously described. The air to be heated in passing downwardly through the pipe 44 flows in counterflow relationship with respect to the flue gases passing upwardly through the chimney 28 and the heat from the flue gases is absorbed through the metal walls of the pipe 44 by the air forced therethrough by the blower 70. The ducts 48, 50, 52, and 58 distribute the heated air to the various rooms of the house. Since the flue gases pass directly in contact with the inside wall of the chimney 28, the walls of the chimney exposed to the rooms of the house will not only give off radiant heat but will also transfer heat to the air in such rooms by the convection circulation of air. The blower 70 preferably is driven by an electric motor, the circuit of which may be controlled in any desired manner; for example, by a manual or thermostatic switch, so that air to be heated will be forced through the pipe 44 when the temperature of the flue gases is above a certain predetermined degree. Gas may be supplied to the burner 32 under the regulation of any suitable control; for example, either by a manual or a thermostatic control.

In the modification illustrated in Figs. 3 and 4, the furnace is arranged so as to utilize a heat vaporizing or pot type of burner 132 as the source of heat. The construction of the chimney 128, the air pipe 144, the header 146 and the other parts of the furnace, including the air circulating means, may be the same as illustrated in Fig. 1. As illustrated in Fig. 4, however, the header 146 is shown as being provided only with two ducts 150 and 152, the duct 152 communicating with a vertical duct 156, which in turn communicates at its bottom with a lateral duct 158, the ducts 150 and 158 functioning to distribute air to the rooms of the house to be heated.

Pot burner 132 is of a type now available on the market and is adapted to burn oil vapors under natural draft circulation of air, the damper controlled air inlet 134 being provided for admitting air to the burner 132 to support combustion. Oil is supplied from a reservoir to the bottom of the pot burner 132 under the control of a conventional float control valve indicated at 133. In order to provide forced draft of the flue gases from the burner, a nozzle 135 supplied with air from the inside of the header 146 is adapted to discharge air under pressure into the combustion space above the burner 132 so as to create a forced draft of the flue gases upwardly through the chimney 128 and outside of the pipe 144. The pipe 144 corresponds in construction and function to the pipe 44 illustrated in Fig. 1 and is supplied with air under pressure, such as by blower 70.

The valve 133 for regulating the flow of oil to the burner may be constructed and arranged so as to open and close the circuit of the blower motor so that when the oil input to the burner 132 is increased the blower 70 will be operative. However, any conventional or desirable control may be used for the burner 132 as well as the blower 70, the object being to circulate air through the pipe 144 in heat exchange relationship with the flue gases when the burner 132 is operating.

In the modification disclosed in Figs. 5 and 6, the construction is the same as that illustrated in Fig. 1, except that the burner is adapted for burning hard fuel instead of gas. As illustrated in Figs. 5 and 6, the chimney 228 is provided with a grate 229 above an ash pit 230, access to the ash pit being provided by a door 234 which also provides for the admission of air to the burner to support combustion. A feed hole 235 closed by door 236 is provided for introducing fuel into the furnace. Air from the space to be heated is forced by a blower such as the blower 70 illustrated in Fig. 1 downwardly through the heat exchange pipe 244 into the header 246, from whence ducts 248, 250, and 252 convey such heated air to the various rooms of the house to be heated. The flue gases resulting from the operation of the burner pass upwardly through the chimney 228 and around the pipe 244 while the air which flows downwardly through the pipe 244 absorbs heat from the flue gases. In this modification the circuit for the air blower may be controlled in any conventional or desired manner.

In Fig. 7 a modification of Figs. 5 and 6 is illustrated. The construction is the same as that illustrated in Figs. 5 and 6 except that a conduit 249 communicating at one end thereof with the duct 248 and at the other end thereof with the fuel bed just above the grate 229 is provided for supplying air under pressure to the combustion chamber so as to provide forced draft of the flue gases upwardly through the chimney 228. In this modification, as in the previous and following modifications, the air supplied to the heat exchanger by the blower is under pressure so that the flue gases cannot enter the conduits conducting air to be heated because the pressure of the air to be heated is above the pressure of the flue gases and therefore the flow will always be from the passageways containing the air to be heated to the passageways which conduct the flue gases.

In the modification illustrated in Figs. 8 and 9, the burner of the furnace may comprise an open fireplace 320 arranged to burn any kind of fuel; such, for example, as coal. The flue gases resulting from the burning of the fuel pass upwardly through the chimney 328. The chimney 328 and air pipe 344 arranged therein may be identical in construction to the corresponding parts illustrated in Fig. 1. Air to be heated is forced downwardly through the pipe 344 by a blower such as that illustrated at 70 in Fig. 1, and a header 346 arranged at the bottom of the pipe 344 and corresponding to the header 46 has connected to it lateral ducts 348, 350, and 352 which conduct the heated air to the various rooms of the house to be heated. The duct 350 may discharge heated air laterally from an opening directly above the opening of the fireplace 320. Except in the foregoing particulars, the construction and operation of the modification illustrated in Figs. 8 and 9 will be exactly the same as that illustrated in Figs. 5 and 6.

In the modification illustrated in Figs. 10 and 11, a fireplace 420 has a chimney 428 connected thereto so as to receive the flue gases resulting from the burning of fuel in the fireplace. The passageway for the flue gases is provided by a metallic smoke pipe 430, the lower end of which terminates in a collecting hood 432 which is arranged so as to receive the flue gases resulting from the burning of fuel in the fireplace. The flue gases pass upwardly through the pipe 430 under natural draft and at the upper end of the pipe 430 pass into the chimney 428 from the upper end of which the flue gases escape through the opening 440. The air to be heated is returned to a blower 470 similar to the blower 70 by conduit 468, header 466 and conduit 464, and air is discharged under pressure from the blower into the space between the pipe 430 and the inside walls of the chimney 428. A plate 429 extending across the chimney 428 at the upper end of the pipe 430, except for an opening therein coinciding with the end of the pipe 430, will prevent the flue gases in the pipe 430 from mixing with the air discharged by the blower 470 which is discharged into the chimney below the plate 429. The air discharged by the blower 470 may be discharged into the chimney in such a way as to set up a spiral circulation of such air around the pipe 430 and adjacent the hood 432. The chimney 428 is provided with suitable openings communicating with ducts 448 and 450 which distribute the heated air to the rooms to be heated. Except in the foregoing particulars, the construction of the embodiment illustrated in Figs. 10 and 11 may be the same as that illustrated in Figs. 8 and 9.

In Figs. 12 and 13 a modification of the construction shown in Figs. 10 and 11 is illustrated in which a gas burner 532 is arranged in the lower part of the chimney 528 above a damper controlled air inlet port 534. The flue gases resulting from the operation of the burner flow upwardly under natural draft through the smoke pipe 530, while the air to be heated is forced downwardly through the space between the smoke pipe 530 and the chimney 528 and discharged through suitable openings arranged opposite the smoke collecting hood 531. One of the openings for heated air in the chimney 528 may communicate with a vertical duct 556 which communicates with a lateral duct 558 which may be arranged below the floor of the dwelling. Except in the foregoing particulars, the construction and operation of the embodiment illustrated in Figs. 12 and 13 is the same as that of the preceding figures.

Figure 16:
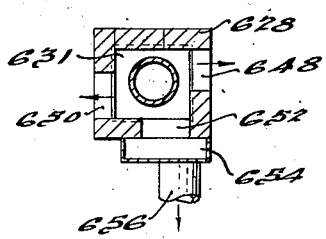
Fig. 16 is a horizontal section taken in a plane along the line 16—16 of Fig. 14, looking in the direction of the arrows.

In Figs. 14 and 16 a modification of the construction illustrated in Fig. 10 is disclosed utilizing a heat vaporizing or pot type of burner 632 as the source of heat. The burner may be of the same construction as that illustrated in Fig. 3, and the oil control valve 633 thereof may be controlled by a room thermostat 620 so that as the temperature of the space to be heated falls, the valve 633 will be operated to supply additional fuel to the burner 632 and vice versa. A damper controlled air inlet port 634 may be provided in the base of the chimney 628 for supplying secondary air to the burner 632. The flue gases are collected by the hood 631 and pass upwardly through the smoke pipe 630 under natural draft, while the air to be heated is forced downwardly by a fan, such as that illustrated at 470 in Fig. 10, between the outside of the smoke pipe 630 and the inside of the chimney 628. Suitable openings 648, 650, and 652 formed in the side walls of the chimney 628 opposite the hood 631 are provided for discharging heated air into the various rooms of the house to be heated. The opening 652 may communicate with a vertical duct 654 which at its lower end communicates with a lateral duct 656 which may be employed for conducting heated air to a distant part of the house.

Figure 17:
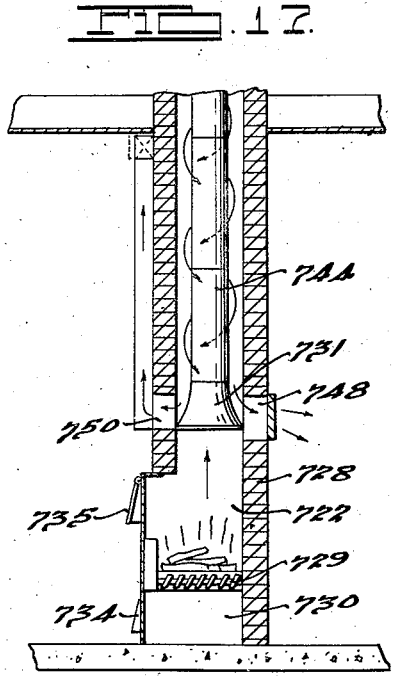
Fig. 17 is a further modification of Figs. 1 and 10 utilizing a combustion burner which is adapted to burn hard fuel.

In the embodiment of the invention illustrated in Fig. 17, which is a modification of Fig. 10, means are provided in the base of the chimney 728 for burning hard fuel, and a grate 729 and ash pit 730 are provided. Access to the ash pit is provided by a door 734 which admits secondary air to the inside of the furnace, while a door 735 is provided for introducing fuel into the furnace. The flue gases from the combustion chamber 722 are collected by a hood 731 which is arranged inside of the chimney. A smoke pipe 744 is connected to the hood so as to conduct the flue gases to the upper part of the chimney in the same manner as that illustrated in Fig. 10. Air to be heated is forced by a blower, such as the blower 470 illustrated in Fig. 10, downwardly through the space between the smoke pipe 744 and the inside wall of the chimney 728, suitable openings 748 and 750 being provided in the wall of the chimney opposite the hood 731 for discharging the heated air into the various parts of the house.

Figure 18:
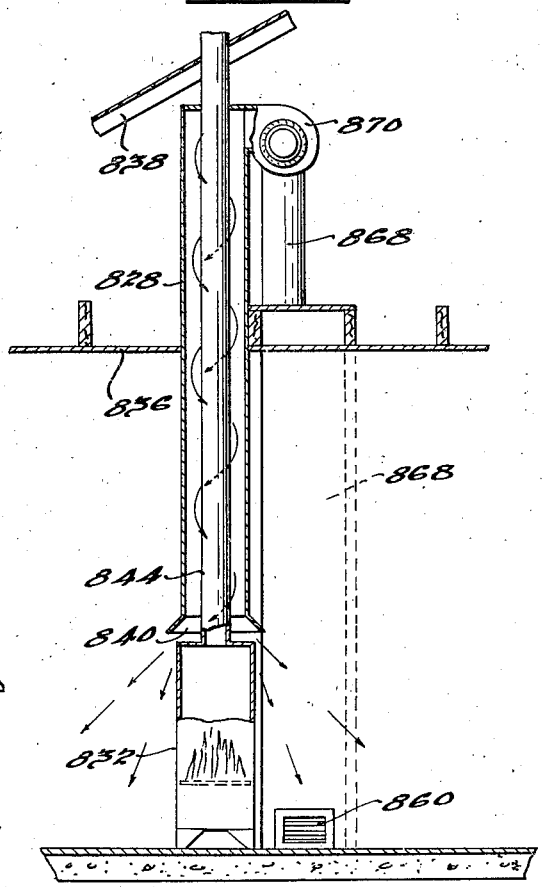
Fig. 18 is a modification of Figs. 1 and 10 and utilizing a radiant burner as the source of heat for the furnace.

In the embod'ment of the invention illustrated in Fig. 18, which is a further modification of the construction illustrated in Fig. 10, a self-contained radiant heater 832 adapted to burn fuel therein (either gas, oil, or hard fuel) is provided with a metal smoke pipe 844 which extends upwardly through the ceiling 836 and the roof 838 for conducting the flue gases from the heater 832 to atmosphere. In lieu of a brick chimney a pipe 828 arranged outside of the smoke pipe 844 and extending throughout a substantial portion of the length thereof is provided for conducting air from a blower 870 in heat exchange relationship with the outside of the smoke pipe 844 and discharging such air downwardly into the space to be heated and around the outside of the heater 832 through the opening 840 provided in the lower end of such pipe 828. The blower 870 draws air to be heated through the return conduit 868 and a return air opening 860 formed in the wall of the room and communicating with the lower end of the return air passageway 868. The pipe 828 is closed at its top around the smoke pipe 844 so that the air discharged by the blower 870 will be forced downwardly through the pipe 828 and out of the opening 840.

It will thus be seen that in all of the embodiments of the invention illustrated that the space within the chimney is utilized to provide a combustion chamber for burning fuel and a heat exchanger, and that the air to be heated is forced through such heat exchanger under pressure by a motor driven blower which not only will aid in effecting the transfer of heat between the flue gases and the air to be heated but will also provide a forced circulation of the heated air through the space within the house due to the arrangement of the passageways for returning the air to be heated to the intake side of the blower. In some of the modifications, means are also provided for effecting forced draft operation of the burner at such times as the air blower is operating. It will be appreciated that many different types of controls for regulating the supply of fuel to the burner and for controlling the operation of the air blower may be provided, and since the invention may be practised by utilizing any desired control arrangement, no particular form of control has been illustrated. The only correlation between burner operation and operation of the air blower that is required is that the blower should operate at least when the heat output of the burner is high, so as to recover the heat from the flue gases and utilize the same. If desired, the collecting hood for the flue gases, such as 432 illustrated in Fig. 10, may be provided with integral fins 410 arranged in the path of flow of the air to be heated for increasing the heat exchange surface of the hood 432 and thereby expediting the transfer of heat between the flue gases and the air to be heated.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

I claim:

1. A heating system for supplying heated air to a space in a building to be occupied by and for the comfort of human beings comprising a chimney which forms an integral part of the structure of the building and which extends upright to and above the roof of the building and has an atmospheric discharge external of the space, a chamber in the lower portion of said chimney constructed and arranged for burning fuel, a heat exchanger member extending longitudinally of and for a substantial portion of the length of said chimney and providing a path for the flow of the products of combustion and a separate unidirectional path for flow of air in intimate countercurrent heat exchange relationship with the combustion products, and outlet means from the lower end of said air path for discharging heated air into said space, said exchanger member being positioned entirely above the zone of substantially complete combustion of the fuel in said chamber, and means outside of said chimney to supply solely to the upper portion of said air path provided by said heat exchanger member all of the air to be heated and under a pressure greater than the pressure of the products of combustion.

2. A heating system for supplying heated air to a space in a building to be occupied by and for the comfort of human beings comprising a chimney which forms part of the building and which extends upright to and above the roof of the building and has an atmospheric discharge external of the space, a combustion chamber in the lower portion of said chimney constructed and arranged for burning fuel under natural draft operation and functioning to supply heated products of combustion to said chimney, a heat exchanger member within and extending along a substantial portion of the length of said chimney and providing a path for the flow of the products of combustion and a separate unidirectional path for flow of air surrounded by and in intimate countercurrent heat exchange relationship with the path for flow of the combustion products upwardly through said combustion products path, outlet means from the lower end of said air path for discharging heated air into said space, at least the greater part of said exchanger member being positioned entirely above the zone of substantially complete combustion of the fuel in said chamber, and means outside of said chimney to supply from said space to the upper portion of the said air path, air to be heated under a pressure greater than the pressure of the products of combustion.

3. A heating system for supplying heated air to a space in a building to be occupied by and for the comfort of human beings comprising a chimney which forms a part of the building and which extends upright to and above the roof of the building and has an atmospheric discharge external of the space, a combustion chamber in the lower portion of said chimney constructed and arranged for burning fuel under natural draft operation and functioning to supply heated products of combustion to said chimney, a heat exchanger member extending longitudinally of and along a substantial portion of the length of said chimney and providing a path for the flow of the products of combustion and a separate uni-directional path for flow of air around and in intimate countercurrent heat exchange relationship with the path for flow of the combustion products upwardly through said combustion products path, outlet means from the lower end of said air path for discharging heated air into said space, at least the greater part of said exchanger member being positioned entirely above the zone of substantially complete combustion of the fuel in said chamber, and means outside of said chimney to supply from said space to the upper portion of said air path, air to be heated, under a pressure greater than the pressure of the products of combustion, and in such a way that the air to be heated initially contacts the cooler part of said heat exchanger member.

4. A heating system for supplying heated air to a space in a building to be occupied by and for the comfort of human beings comprising a chimney which forms an integral part of the structure of the building and which extends upright to and above the roof of the building and has an atmospheric discharge external of the space, a chamber in the lower portion of said chimney constructed and arranged for burning fuel, a heat exchanger member extending longitudinally of and for a substantial portion of the length of said chimney and providing a path for the flow of the products of combustion and a separate unidirectional path for flow of air in intimate countercurrent heat exchange relationship with the combustion products, outlet means from the lower end of said air path for discharging heated air into said space, said air path having its lower end arranged in a manner relative to the combustion chamber zone of fire which will substantially eliminate sooting of the combustion chamber walls, and means outside of said chimney to supply solely to the upper portion of said air path all of the air to be heated and under a pressure greater than the pressure of the products of combustion.

5. A heating system for supplying heated air to a space in a building to be occupied by and for the comfort of human beings comprising a chimney which forms part of the building and which extends upright to and above the roof of the building and has an atmospheric discharge external of the space, a combustion chamber in the lower portion of said chimney constructed and arranged for burning fuel under natural draft operation and functioning to supply heated products of combustion to said chimney, a heat exchanger member within and extending along a substantial portion of the length of said chimney and providing a path for the flow of the products of combustion and a separate unidirectional path for flow of air surrounded by and in intimate countercurrent heat exchange relationship with the path for flow of the combustion products upwardly through said combustion products path, outlet means from the lower end of said air path for discharging heated air into said space, and means outside of said chimney to supply from said space to the upper portion of said air path, air to be heated and under a pressure greater than the pressure of the products of combustion.

6. A heating system for supplying heated air to a space in a building to be occupied by and for the comfort of human beings comprising a chimney which forms a part of the building and which extends upright to and above the roof of the building and has an atmospheric discharge external of the space, a combustion chamber in the lower portion of said chimney constructed and arranged for burning fuel under natural draft operation and functioning to supply heated products of combustion to said chimney, a heat exchanger member extending longitudinally of and along a substantial portion of the length of said chimney and providing a path for the flow of the products of combustion and a separate unidirectional path for flow of air around and in intimate countercurrent heat exchange relationship with the path for flow of the combustion products upwardly through said combustion products path, outlet means from the lower end of said air path for discharging heated air into said space, said air path having its lower end arranged in a manner relative to the combustion chamber zone of fire which will substantially eliminate sooting of the combustion chamber walls, and means outside of said chimney to supply from said space to the upper portion of said air path, air to be heated and under a pressure greater than the pressure of the products of combustion.

7. A heating system for supplying heated air to a space in a building to be occupied by and for the comfort of human beings comprising a chimney which forms part of the building and which extends upright to and above the roof of the building and has an atmospheric discharge external of the space, a combustion chamber in the lower portion of said chimney constructed and ararnged for burning fuel under natural draft operation and functioning to supply heated products of combustion to said chimney, a heat exchanger member extending along a substantial portion of the length of said chimney and providing a path for the flow of the products of combustion and a separate unidirectional path for flow of air in intimate countercurrent heat exchange relationship with the path for flow of the combustion products upwardly through said combustion products path, outlet means from the lower end of said air path for discharging heated air into said space, the side walls of said combustion chamber opposite the zone of substantially complete combustion of the fuel in said chamber being arranged out of the path of flow of air through said heating system so as substantially to eliminate chilling of such walls, and means outside of said chimney to supply from said space to the upper portion of said air path, air to be heated and under a pressure greater than the pressure of the products of combustion, said combustion chamber being provided with means for supplying a combustible mixture of oil and air thereto.

8. A heating system for supplying heated air to a space in a building to be occupied by and for the comfort of human beings comprising a masonry chimney which forms part of the building and which extends upright to and above the roof of the building and has an atmospheric discharge external of the space, a chamber in the lower portion of said chimney constructed and arranged for burning fuel, a substantially straight heat exchanger member extending for a substantial portion of and along the length of said chimney and providing a path for the flow of the products of combustion and a separate unidirectional path for flow of air in intimate countercurrent heat exchange relationship with the path of flow of the combustion products upwardly through said combustion products path, outlet means from said air path for discharging heated air into said space, the lower portion of the exchanger member being at or above a point where substantially complete combustion of the fuel has occurred in said chamber, and means including an opening in the upper portion of the wall of said chimney opposite the upper end of said heat exchanger member and a blower communicating with said opening and arranged externally of said chimney to supply, from said space, air to be heated to the upper portion of said air path and under a pressure greater than the pressure of the products of combustion.

9. A heating system for supplying heated air to a space in a building to be occupied by and for the comfort of human beings comprising a masonry chimney which forms and integral part of the structure of the building and which extends upright to and above the roof over said space and has an atmospheric discharge external of the space, a chamber formed in the lower portion of said chimney and at least partially by the walls thereof and constructed and arranged for burning fuel under natural draft, a metallic heat exchanger member comprising a substantially straight pipe extending for a substantial portion of and along the length of and within said chimney, said heat exchanger member separating the space within said chimney into two paths, one around the other, one of which is a substantially straight path for the upward flow under natural draft of the products of combustion from said combustion chamber to said atmospheric discharge and the other of which is a path for the downward flow of air in intimate countercurrent heat exchange relationship with the combustion products, outlet means from the lower end of said air path for discharging heated air into said building space, and means including an opening in the upper portion of the wall of said chimney to supply air to be heated to the upper portion of said air path, under a pressure greater than the pressure of the products of combustion, and in such a way that the air to be heated initially contacts the cooler part of said heat exchanger member.

10. A heating system for supplying heated air to a space in a building to be occupied by and for the comfort of human beings comprising a chimney which forms part of the building and which extends upright to and above the roof of the building and has an atmospheric discharge external of the space, a chamber in the lower portion of said chimney constructed and arranged for burning fuel under a natural draft, a heat exchanger member extending for a substantial portion of and along the length of said chimney and dividing the space therein into a path for flow of the combustion products and a separate unidirectional path for flow of air in intimate countercurrent heat exchange relationship with the combustion products, outlet means from the lower end of said air path for discharging heated air into said space, the lower portion of the exchanger member being at or above a point where substantially complete combustion of the fuel has occurred in said chamber, and means outside of the chimney and spaced from the exchanger member to supply, from said space, air to be heated to the upper portion of said air path under a pressure greater than the pressure of the products of combustion, said chimney and heat exchanger member providing a substantially straight flue for conducting and inducing a natural draft of the products of combustion from said chamber to atmosphere and characterized by substantially linear flow.

11. A heating system for supplying heated air to a space in a building to be occupied by and for the comfort of human beings comprising a masonry chimney which forms part of the building and which extends upright to and above the roof of the building and has an atmospheric discharge external of the space, a chamber in the lower portion of said chimney constructed and arranged for burning fuel under a natural draft operation and functioning to supply heated products of combustion to said chimney, a heat exchanger member extending for a substantial portion of and along the length of said chimney and providing a path for flow of the combustion products and a separate unidirectional path for flow of air in intimate countercurrent heat exchange relationship with the path for flow of the combustion products, outlet means from the lower end of said air path for discharging heated air into said space, and means spaced from the exchanger member and outside of said chimney to supply air to be heated to the upper portion of said air path, under a pressure greater than the pressure of the products of combustion and in such a way that the air to be heated initially contacts the cooler part of said heat exchanger member, said chimney and heat exchanger member providing a substantially straight flue for conducting and inducing a natural draft of the products of combustion from said chamber to atmosphere and characterized by substantially linear flow.

12. A heating system for supplying heated air to a space in a building to be occupied by and for the comfort of human beings comprising a masonry chimney which forms part of the building and which extends upright from its lower portion to an atmospheric discharge external of the space and above the roof, a chamber formed in said lower chimney portion and at least partially by the walls thereof and constructed and arranged for burning fuel under natural draft operation and functioning to supply heated products of combustion to said chimney, a heat exchanger extending within said chimney and for a substantial portion of and along the length thereof, said heat exchanger separating the space within said chimney into two paths, one of which paths being a substantially straight path for the upward flow under natural draft of the products of combustion from said combustion chamber to said atmospheric discharge and the other of which being a unidirectional path for the downward flow of air in intimate countercurrent heat exchange relationship with the combustion products, outlet means from the lower end of said air path for discharging heated air into said building space, and means externally of said chimney to supply, from said building space, air to be heated to the upper portion of said air path under a pressure greater than the pressure of the products of combustion.

13. A heating system for supplying heated air to a space in a building to be occupied by and for the comfort of human beings comprising a chimney which forms part of the building and which extends upright from its lower portion to an atmospheric discharge external of the space and above the roof of the building, a chamber formed in said lower chimney portion and at least partially by the walls thereof and constructed and arranged for burning fuel under natural draft operation and functioning to supply heated products of combustion to said chimney, a tubular heat exchanger extending within said chimney and for a substantial portion of and along the length thereof, said heat exchanger separating the space within said chimney into two paths, one around the other, one of which paths being a substantially straight path for the upward flow under natural draft of the products of combustion from said combustion chamber to said atmospheric discharge and the other of which being a path for the downward flow of air in intimate countercurrent heat exchange relationship with the combustion products, outlet means from the lower end of said air path for discharging heated air into said building space, and means disposed externally of said chimney to supply, from said building space, air to be heated to the upper portion of said air path under a pressure greater than the pressure of the products of combustion and in such a way that the air to be heated initially contacts the cooler part of said heat exchanger.

14. A heating system for supplying heated air to a space in a building to be occupied by and for the comfort of human beings comprising a chimney which is upright to its atmospheric discharge external of the space and above the roof of the building, a chamber in the lower portion of said chimney constructed and arranged for burning fuel, a hollow metallic heat exchanger member extending longitudinally and for a substantial portion of and along the length of said chimney and providing a path for flow of combustion products and a separate unidirectional path for flow of air surrounded by and in intimate countercurrent heat exchange relationship with the combustion products, the lower portion of the exchanger member terminating in a header member, said header member being supported by said chimney adjacent the upper end of said combustion chamber and at least one laterally extending outlet opening extending through the chimney wall into said space and which outlet opening is adapted to discharge heated air into said space, and means spaced from the exchanger member to supply, from said space, air to be heated to the upper portion of said air path under a pressure greater than the pressure of the products of combustion.

15. A heating system for supplying heated air to a space in a building to be occupied by and for the comfort of human beings comprising a masonry chimney which is upright to its atmospheric discharge external of the space and above the roof of the building, a combustion chamber in the lower portion of said chimney constructed and arranged for burning fuel, a metallic heat exchanger member extending longitudinally and for a substantial portion of and along the length of said chimney and providing a path for flow of the combustion products and a separate unidirectional path for flow of air in intimate countercurrent heat exchange relationship with the combustion products, the lower portion of the exchanger member terminating in a supporting member having a laterally extending flange engaging the chimney walls and separating from the combustion chamber the space thereabove and surrounding the heat exchanger member, an opening in said chimney wall communicating with the lower end of said air path and adapted to discharge heated air into said space, and means spaced from the exchanger member and outside of said chimney to supply from said space to the upper end of said air path air to be heated, said last-named means supplying the air under a pressure greater than the pressure of the products of combustion.

16. A heating system for supplying heated air to a space in a building to be occupied by and for the comfort of human beings comprising a masonry chimney which forms part of the building and which extends upright from its lower portion to an atmospheric discharge external of the space and above the roof, a chamber formed in said lower chimney portion and at least partially by the walls thereof and constructed and arranged for burning fuel under natural draft, a cylindrical sheet metal heat exchanger extending longitudinally of and within said chimney and for a substantial portion of the length thereof, said heat exchanger separating the space within said chimney into two paths, one within the heat exchanger and the other around the heat exchanger and formed by the outside of the same and the inside wall of said chimney, one of which paths being a substantially straight path for the upward flow under natural draft of the products of combustion and the other of which being a path for the downward flow of air in intimate counter-current heat exchange relationship with the combustion products, outlet means from the lower end of said air path for discharging heated air into said building space, the lower portion of the exchanger terminating in a supporting member which is arranged adjacent the upper end of said combustion chamber, and means outside of said chimney to supply air from said building space to be heated to the upper portion of said air path under a pressure greater than the pressure of the products of combustion, and in such a way that the air to be heated initially contacts that part of said heat exchanger remote from said combustion chamber.

17. In a heating system for a building for human occupancy having a room and an attic space, a chimney extending upward above the roof, a heat exchanger within the chimney and extending longitudinally of and for a substantial portion of the length thereof, said exchanger being of substantially uniform cross sectional area and substantially straight, a combustion chamber in the lower portion of said chimney and below said exchanger, said chimney and said exchanger cooperating to provide parallel counterflow ducts for the combustion products and for air to be heated, an air feeding conduit leading through said attic space to the upper end of the exchanger air duct and having an inlet below the ceiling level of said room, a conduit leading from the lower end of said exchanger air duct and discharging into said room, and a fan in said attic space and intercalated in said feeding conduit and discharging air from said room inlet into said exchanger air duct under pressure greater than the pressure of the combustion products so that any leakage of the exchanger will be of air into the combustion products duct.

18. In a heating system for a building for human occupancy having a room and an attic space, a vertical masonry chimney extending upwardly above the roof of said building, a heat exchanger extending longitudinally of and for a substantial portion of the length of said chimney, said exchanger comprising an elongated substantially straight hollow member, said chimney and said exchanger cooperating to provide parallel counterflow ducts for the combustion products and for air to be heated, the duct for the combustion products surrounding the duct for the air to be heated, a combustion chamber in the lower portion of said chimney and adapted to supply heated products of combustion to the lower end of said combustion products duct, an air feeding conduit leading through said attic space to the upper end of said air duct and having an inlet communicating with the space in said room, outlet means leading from the lower end of said air duct for discharging heated air into said room, and a fan intercalated in said feeding conduit and discharging air from said room inlet into said air duct under pressure greater than the pressure of the combustion products so that any leakage of the exchanger will be of air into the combustion products duct.

19. In a heating system for a building for human occupany having a room and an attic space, a vertical masonry chimney extending upwardly above the roof of said building, a heat exchanger extending longitudinally of and for a substantial portion of the length of said chimney, said exchanger comprising an elongated substantially straight hollow member, said chimney and said exchanger cooperating to provide parallel counterflow ducts for the combustion products and for air to be heated, the duct for the air to be heated surrounding the duct for the combustion products, a combustion chamber in the lower portion of said chimney and adapted to supply heated products of combustion to the lower end of said combustion products duct, an air feeding conduit leading through said attic space to the upper end of said air duct and having an inlet communicating with the space in said room, outlet means leading from the lower end of said air duct for discharging heated air into said room, and a fan intercalated in said feeding conduit and discharging air from said room inlet into said air duct under pressure greater than the pressure of the combustion products so that any leakage of the exchanger will be of air into the combustion products duct.

20. In a heating system for a building for human occupancy having a plurality of rooms and an attic space, a central chimney forming a part of said building and extending upwardly above the roof of said building, a heat exchanger within the chimney and extending longitudinally and for a substantial portion of the length thereof, said heat exchanger comprising an elongated, substantially straight tubular member, said chimney and said exchanger cooperating to provide parallel counterflow ducts in heat exchange relationship for the combustion products and for air to be heated, a combustion chamber in the lower portion of said chimney arranged so as to be accessible from the level of the floor of one of said rooms and adapted to supply heated products of combustion under natural draft to the lower end of said combustion products duct, an air feeding conduit leading through said attic space to the upper end of said air duct and having an inlet communicating with the space in at least one of said rooms, a plurality of outlets arranged in different faces of said chimney and leading from the lower end of said air duct for discharging heated air into certain of said rooms, and a fan intercalated in said feeding conduit and discharging air from said inlet into said air duct under pressure greater than the pressure of the combustion products so that any leakage of said exchanger will be of air into the combustion products duct.

21. In a heating system for a building for human occupancy having a room, a vertical masonry chimney forming a part of said building and extending upwardly above the roof of said building, a heat exchanger extending longitudinally and for a substantial portion of and along the length of said chimney, said chimney and said exchanger cooperating to provide parallel counterflow ducts for the combustion products and for air to be heated, a combustion chamber in the lower portion of said chimney and disposed at an elevation so as to be accessible from the level of the floor of said room and adapted to supply heated products of combustion under natural draft to the lower end of said combustion products duct, an air feeding conduit outside of said chimney leading to the upper end of the exchanger air duct and having an inlet communicating with the space in said room, outlet means from the lower end of said exchanger air duct for discharging heated air into said room, and a fan arranged externally of said chimney adjacent the upper portion thereof and intercalated in said feeding conduit and discharging air from said room inlet into said exchanger air duct under pressure greater than the pressure of the combustion products and in such a way that the air to be heated initially contacts the part of said heat exchanger remote from said combustion chamber.

22. In a heating system for a building for human occupancy having a room, a vertical masonry chimney forming a part of said building and extending upwardly above the roof of said building, a heat exchanger extending longitudinally and for a substantial portion of and along the length of said chimney, said exchanger comprising an elongated, substantially straight tubular member, said chimney and said exchanger cooperating to provide parallel counterflow ducts for the combustion products and for air to be heated, the duct for the air to be heated surrounding the duct for the combustion products, a combustion chamber in the lower portion of said chimney and disposed at an elevation so as to be accessible from the level of the floor of said room and adapted to supply heated products of combustion under natural draft to the lower end of said combustion products duct, an air feeding conduit outside of said chimney leading to the end of said air duct at the upper end of said exchanger and having an inlet communicating with the space in said room, outlet means from the lower end of said exchanger air duct for discharging heated air into said room, and a fan arranged externally of said chimney adjacent the upper portion thereof and intercalated in said feeding conduit and discharging air from said room inlet into said exchanger air duct under pressure greater than the pressure of the combustion products so that any leakage of the exchanger will be of air into the combustion products duct.

23. In a heating system for a building for human occupancy having a room, a vertical masonry chimney forming a part of said building and extending upwardly above the roof of said building, a heat exchanger extending longitudinally and for a substantial portion of and along the length of said chimney, said exchanger comprising an elongated substantially straight tubular member, said chimney and said exchanger cooperating to provide parallel counterflow ducts for the combustion products and for air to be heated, the duct for the combustion products surrounding the duct for the air to be heated, a combustion chamber in the lower portion of said chimney and disposed at an elevation so as to be accessible from the level of the floor of said room and adapted to supply heated products of combustion under natural draft to the lower end of said combustion products duct, an air feeding conduit outside of said chimney leading to the upper end of the exchanger air duct and having an inlet communicating with the space in said room, outlet means from the lower end of said exchanger air duct for discharging heated air into said room, and a fan arranged externally of said chimney adjacent the upper portion thereof and intercalated in said feeding conduit and discharging air from said room inlet into said exchanger air duct under pressure greater than the pressure of the combustion products so that any leakage of the exchanger will be of air into the combustion products duct.

24. An apparatus for supplying warm air to a space to be heated in a building comprising, a chimney having a combustion chamber in its lower portion, means in said combustion chamber for burning fuel and being positioned substantially at the building floor level, said chimney extending upright from the top of said chamber to above the roof of said building, means separating the interior of said chimney into an air flow duct and a combustion products duct, said air flow duct having an inlet at its upper end and having an outlet into the space to be heated and providing for counter-current flow of the air to be heated relative to the upward flow of the combustion products, and means including an air moving device to supply air from said space to said air flow duct inlet under a pressure greater than the pressure of the combustion products so that any leakage will cause discharge of air into said combustion products duct, said air moving device being arranged opposite the upper end of said separating means and externally of said chimney.

25. An apparatus for supplying warm air to a space to be heated in a building comprising, a chimney having a combustion chamber in its lower portion, said chimney having its lower portion below the building floor level and extending upright from the top of said chamber to above the roof of said building, means in said combustion chamber for burning fuel and positioned substantially at the building floor level, means separating the interior of said chimney above said combustion chamber into an air flow duct and a combustion products duct in counterflow heat exchange relationship with each other, said air flow duct having an outlet into the space to be heated, and means to supply air to said air flow duct at a point remote from said combustion chamber under a pressure greater than the pressure of the combustion products so that any leakage will cause discharge of air into said combustion products duct.

MORITZ L. MUELLER.

CERTIFICATE OF CORRECTION.

Patent No. 2,274,341. February 24, 1942.

MORITZ L. MUELLER.

It is hereby certified that error appears in the printed specification of the above numbered patent requiring correction as follows: Page 5, first column, line 68, claim 7, for "ararnged" read --arranged--; and second column, line 51, for "and integral" read --an integral--; page 6, second column, line 75, claim 14, after "and" insert --having--; and that the said Letters Patent should be read with this correction therein that the same may conform to the record of the case in the Patent Office.

Signed and sealed this 5th day of May, A. D. 1942.

(Seal)

Henry Van Arsdale,
Acting Commissioner of Patents.